July 18, 1939.   B. COHN ET AL   2,166,624
VEGETABLE CUTTER
Filed Dec. 15, 1937
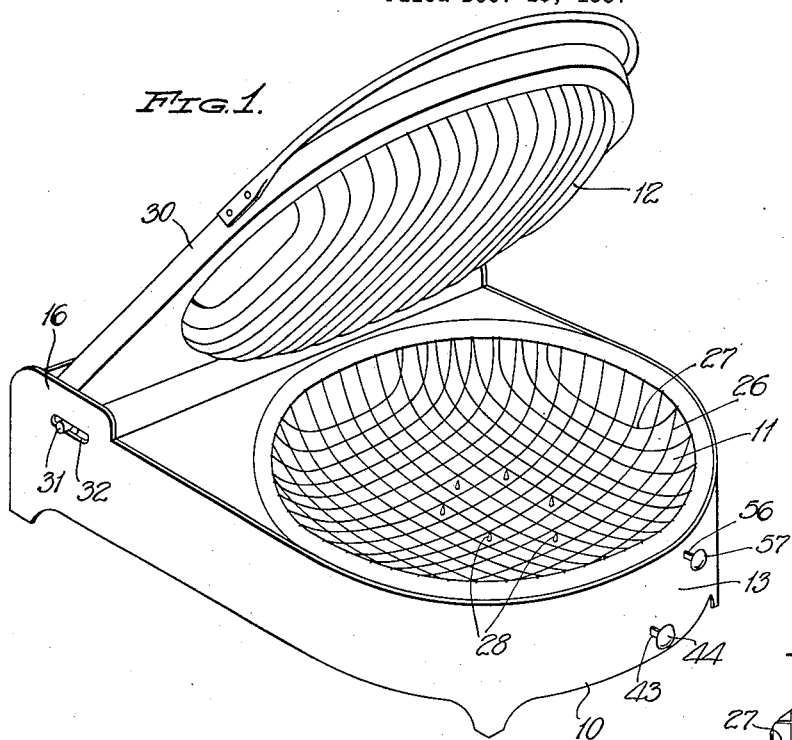
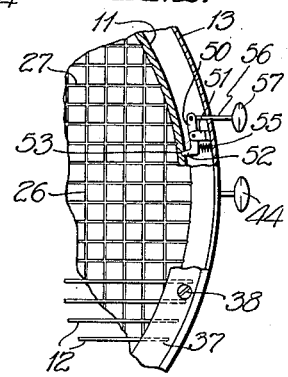
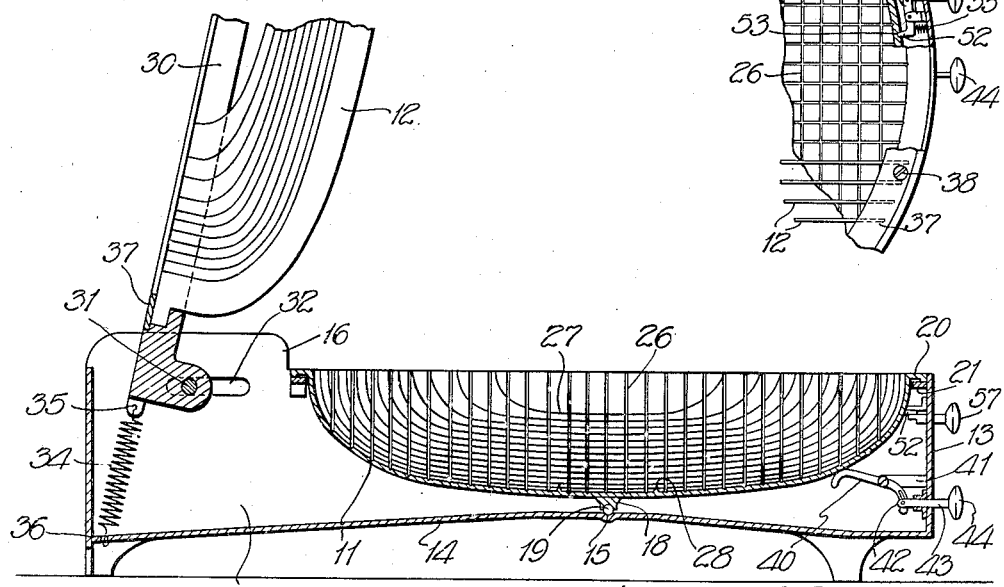
LEONARD A. SWARTHE.
BERNARD COHN.
INVENTOR.
BY Ely Pattison
ATTORNEYS.
WITNESS:

Patented July 18, 1939

2,166,624

UNITED STATES PATENT OFFICE 2,166,624

VEGETABLE CUTTER

Bernard Cohn and Leonard A. Swarthe,
New York, N. Y.

Application December 15, 1937, Serial No. 179,816

2 Claims. (Cl. 146—139)

This invention relates to new and useful improvements in vegetable cutters and more particularly to vegetable cutters of the type employed for preparing vegetables for use as food.

One object of the present invention is to improve the construction and mode of operation of vegetable cutters and to provide such devices with mechanism which will effect a better cutting operation than prior machines.

A feature of the present invention consists in the provision, in a device of the character above outlined, of means for containing the vegetable being operated upon and for positioning said means at various positions relatively to a cutting mechanism to provide for cutting the vegetable along intersecting lines of cut, thereby to reduce the same to relatively small pieces after the manner of so-called dicing.

Another feature of the invention resides in the provision of a novel mechanism whereby the cutting knives have a compound movement during the cutting operation.

Still another feature of the invention resides in a novel means for holding or securing the vegetable containing means against movement in its adjusted position relative to the cutting knives.

Still another feature of the invention resides in the provision of means for retaining a vegetable being operated upon, against movement relatively to the vegetable container during the cutting operation.

Still another feature of the invention resides in a new and novel arrangement of parts whereby the cutting blades are held normally in a remote position with respect to the interior of the vegetable container.

Certain other features of the invention relate to means for rotatably mounting the vegetable receptacle for providing for its ready removal from a support upon which it is mounted.

Other features of the invention relate to certain novel and improved constructions, arrangements and combinations of parts hereinafter described and particularly pointed out in the claims, the advantages of which will be readily understood and appreciated by those skilled in the art.

The invention will be clearly understood from the accompanying drawing illustrating the invention in its preferred form and the following detailed description of the constructions therein shown.

In the drawing:

Figure 1 is a perspective view illustrating a device constructed in accordance with the present invention, the device being shown in a partly opened position, Figure 2 is a horizontal sectional view on an enlarged scale, the view illustrating the mechanism which holds the receptacle against rotation relatively to the base, and;

Figure 3 is a sectional view taken substantially on the line 3—3 of Figure 1.

A device constructed in accordance with the present invention includes a base member 10 in which is mounted a suitable receptacle 11 for receiving and holding the materials to be cut by a plurality of knives 12 which are so mounted as to swing into the receptacle into cutting engagement with the bottom wall thereof.

The base member 10 is of general rectangular form, except that it is preferably formed with a curved front wall 13. This base member is hollow and has a bottom wall 14, centrally of which, there is a bearing 15. Upstanding from two opposite side walls of the base, there are ears 16, these ears being located preferably at the rear of the base 10.

The receptacle 11 heretofore referred to is preferably bowl-shaped and is provided upon its outer bottom face with a bearing member 18 for the reception of a roller bearing 19, which is seated in the bearing 15. This construction provides for rotatably mounting the receptacle 11 in the base member for a purpose which will be hereinafter described.

The receptacle 11, is also provided with a flange 20 which extends around and projects outwardly from the peripheral edge of the receptacle as more clearly shown in Figure 3. This flange 20 is adapted to ride upon an inwardly extending flange 21 carried by the base member 10 and the interengagement of these flanges, serves to maintain the receptacle 11 in position during its rotating movement and also to aid the center bearing heretofore mentioned in the support of the receptacle 11.

The receptacle 11 is provided in its bottom inner face with two series of intersecting grooves, the grooves in one series being designated 25, the grooves in the other series being designated 27 in Figure 1. The grooves of either of these series, depending upon the position of the receptacle, are adapted to receive the knives 12 heretofore mentioned in such a manner that the cutting edge of the knives, as they pass between the side walls of their respective grooves, cooperate with the upper edges of the side walls to perform the cutting operation. Means is provided to retain the materials being cut against movement relatively to the receptacle 11, and in the present embodiment of the invention, this means consists of a plurality of spaced upstanding pins or the like 28 grouped near the center of the receptacle 11.

The knives heretofore mentioned, are carried by a member 30 of the same general shape as the base member 10, and the member 30 is pivotally mounted upon the base 10 in such a manner that it not only swings about its pivotal point to move the knives into engagement with their respective grooves in the bottom of the receptacle, but also to give a sliding movement to the knives to more effectively cut the materials being operated upon.

The pivotal mounting of the member 30 is accomplished by bearing pins 31, which pass through slots 32 in the base member 10 and the member 30 is held normally in an elevated position as shown in Figure 3, by a spring 34, one end of which is connected as at 35 to the pivoted member 30, the other end of the spring being connected as at 36 to the base member 10.

The knives 12 are removably mounted in the member 30 in the following manner.

The member 30 is formed with an opening which is circular in shape and the several knives bridge this opening with the ends of the knives received in recesses arranged in properly spaced relation around the opening in the member 30. The several knives are held in position by a ring 37 which in turn is secured to the member 30 by a plurality of screws or the like 38, of which one is illustrated in Figure 2. Thus it will be apparent that the knives may be removed at will, merely by removing the ring 37.

As above described, the receptacle 11, merely rests in the base 10 and means is provided to render the same readily removable when occasion requires. This means consists of a pivoted lever 40 pivotally mounted in a bracket 41 extending from the base 10. The inner end of this lever engages the under surface of the receptacle and its outer end is curved downwardly and is slotted for pivotal connection as at 42 with a plunger 43 having an operating knob 44. Pressure upon the operating knob 44 will rock the lever 40 about its pivotal point and elevate its inner end and raise the receptacle to a point where it may be readily grasped and removed from the base 10.

The member 30 is moved about its pivotal point by a handle 48 and as above stated, it has both a swinging and sliding movement as it moves from its elevated position to position within the receptacle. This compound movement of the member 30 is obtained by reason of the bearing pins sliding forwardly in the slots 32, it being understood that this sliding movement is obtained by pulling upon the handle at the same time that the member 30 is swung about its pivotal point.

The receptacle is so positioned that as the member 30 is moved to position therein, the knives will enter the grooves of one of the series of grooves in the bottom thereof.

For example, in Figure 1, depression of the member 30, causes the knives 12 to enter the grooves 27 and it will be obvious that when the device is operated, any material which may be within the receptacle 11, will be cut by the knives 12. If it is only desired to cut the material into strips, the above operation will be all that is necessary.

However, if it is desired to cut the stripped material into short lengths, the receptacle is moved through ninety (90°) degrees in which position, the grooves 26 will be in position to receive the knives 12 when the member 30 is again depressed.

Means is provided to retain the receptacle in its adjusted position and this means comprises a spring pressed lever 50 pivotally mounted in a bracket 51 carried by the base. This lever has a right angular end extension 52 which is adapted to be received in one of a plurality of recesses 53 and when so positioned, holds the receptacle against turning in the base.

The end 52 of the lever 50 is retained in engagement with one of the recesses 53, by a coil spring 55, and may be disengaged from a recess by a plunger 56 which has an operating knob 57.

If, after the lever 56 has been removed from engagement with a recess 53, pressure upon the knob 57 is relieved, the spring 55 will cause the end of the lever to engage the next recess as the receptacle is revolved, thus automatically positioning the receptacle so that the grooves of one or the other of the two series of grooves will be in position to receive the knives 12 upon a downward movement of the member 30.

While the device of the present invention has many uses, it particularly lends itself to cutting vegetables and it may be employed for cutting vegetables into strips or short lengths as desired.

For example if celery is placed in the receptacle in such a manner that it lies parallel with the knives, upon depression of the member 30, the knives will cut the celery into long strips. To cut the celery into short lengths after it has been cut into strips, it is only necessary to move the receptacle through ninety (90°) degrees to position the previously cut strips at right angles to the knives which will, when they are depressed, reduce the strips, to short lengths.

The device may also be employed for cutting up potatoes, tomatoes and similar vegetable and fruits, and is particularly adapted to the slicing of tomatoes, since in operation, it produces the sliding cut so necessary when slicing tomatoes and similarly thin skinned fruits and vegetables.

In the cutting of potatoes and the like into relatively small pieces, the potato is placed in the receptacle and the member 30 depressed. This operation reduces the potato to slices which are then positioned flatwise and the member 30 again depressed which cuts the slices into strips. The receptacle is next rotated through ninety (90°) degrees to position the strips at right angles to the knives which, when the member 30 is depressed, cuts the strips into short lengths equal in length to the spaces between the knives.

It will also be apparent that by merely continuing the rotation of the receptacle in a step by step manner, the device may also be employed for mincing or fine chopping of various articles as desired.

From the foregoing, it will be apparent that the present invention provides a new and improved device of the character described and in which, the several objects are accomplished and while the invention has been illustrated in its preferred form, it is to be understood that it is not to be limited to the construction herein shown, and that it may be embodied in other forms without departing from the spirit thereof.

Having thus described the invention, what is claimed as new, is:

1. A vegetable cutter comprising a base having an opening therein, a bowl rotatably mounted in said opening, a plurality of knives for movement into and out of the bowl, the cutting edge of each knife being curved to conform to the curvature of the cooperating contacting inner surface of the bowl and means for slidably and pivotally mounting said knives, said means comprising a frame for mounting said knives, bearing pins projecting from the knife frame and extending through elongated slots in the base whereby upon pivotal movement of the knife frame, the bearing pins may be moved longitudinally of their respective elongated slots to impart reciprocating movement to the knife frame.

2. A vegetable cutter comprising a base having an opening therein, a bowl rotatably mounted in said opening, a plurality of knives for movement into and out of the bowl, the cutting edge of each knife being curved to conform to the curvature of the cooperating contacting inner surface of the bowl and means for slidably and pivotally mounting said knives, said means comprising a frame for mounting said knives, bearing pins projecting from the knife frame and extending through elongated slots in the base whereby upon pivotal movement of the knife frame, the bearing pins may be moved longitudinally of their respective elongated slots to impart reciprocating movement to the knife frame, and a coiled spring connected at one end to the base and at its other end to the knife frame normally to maintain the knife frame in an elevated position with the bearing pins in the rear portions of their respective slots.

BERNARD COHN.
LEONARD A. SWARTHE.